UNITED STATES PATENT OFFICE.

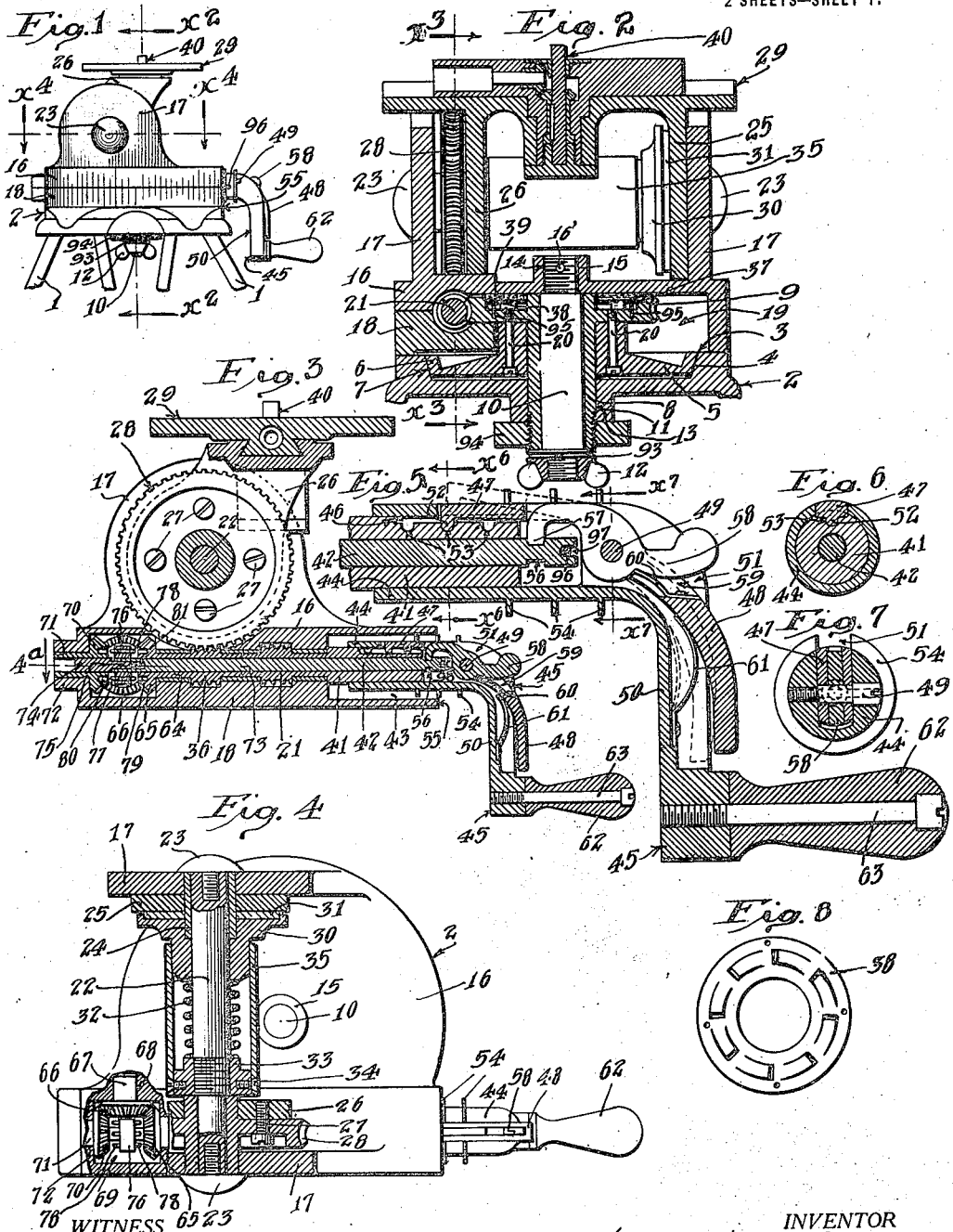

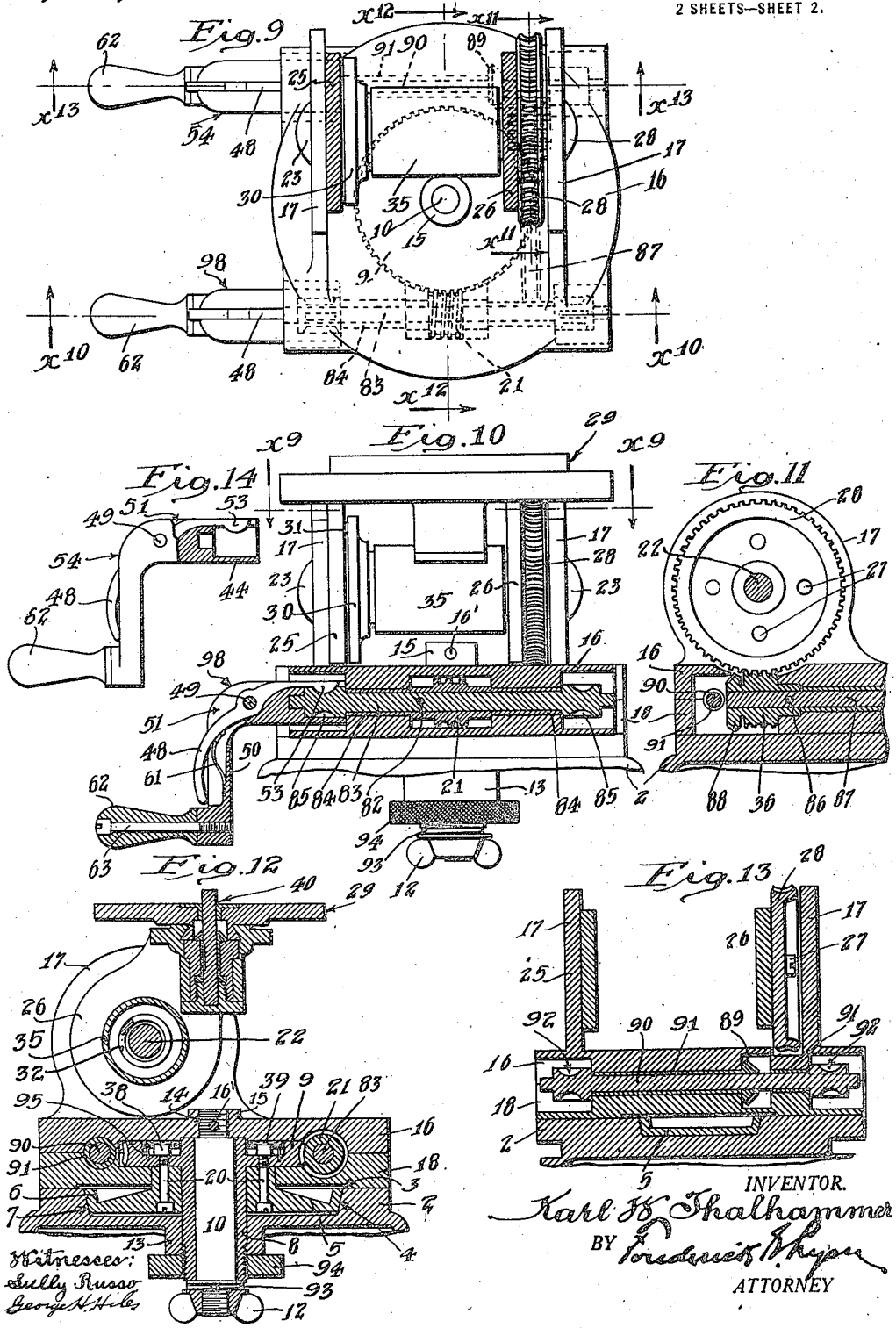

KARL W. THALHAMMER, OF LOS ANGELES, CALIFORNIA.

SUPPORT FOR CAMERAS.

1,425,807.  Specification of Letters Patent.  Patented Aug. 15, 1922.

Application filed August 19, 1919. Serial No. 318,615.

*To all whom it may concern:*

Be it known that I, KARL W. THALHAMMER, a citizen of Austria, residing at Los Angeles, in the county of Los Angeles and State of California, have invented a new and useful Support for Cameras, of which the following is a specification.

This invention relates to a camera support adapted to operate to produce tilting of the camera to various angles and horizontal rotation, or "panning," as it is termed, of the camera.

An object of the invention is to produce the tilting and horizontal turning by mechanism that is easily operated.

Another object is to make provision for simultaneous tilting and panning of the camera in a variety of directions.

Another object is to make provision for stopping the tilting and panning movements immediately when the operator ceases the cranking movement.

Another object is to provide a support of this character of substantial and durable construction, and one which will not readily get out of order.

Other objects and advantages will appear in the subjoined detailed description.

The accompanying drawings illustrate the invention:

Figure 1 is a side elevation of a camera support made in accordance with the provisions of this invention, fragments of the tripod legs also being shown.

Fig. 2 is an enlarged sectional elevation on line indicated by $x^2$—$x^2$, Fig. 1, the tripod legs being broken away.

Fig. 3 is a sectional elevation on line indicated by $x^3$—$x^3$, Fig. 2.

Fig. 4 is an enlarged plan mainly in section on line indicated by $x^4$—$x^4$, Fig. 1, a portion being in section on line 4$^a$, Fig. 3.

Fig. 5 is an enlarged detail, mainly in section, of the operating crank and the parts with which it connects, broken lines indicating one of the clutch levers in disengaged position.

Fig. 6 is a sectional elevation on line indicated by $x^6$—$x^6$, Fig. 5.

Fig. 7 is an elevation mainly in section on line indicated by $x^7$—$x^7$, Fig. 5.

Fig. 8 is an inverted plan view of the spring washer shown in Fig. 2.

Fig. 9 is a plan view of a modification of the invention, the tilting table being shown in section on line indicated by $x^9$—$x^9$, Fig. 10.

Fig. 10 is an elevation mainly in vertical section on line indicated by $x^{10}$—$x^{10}$, Fig. 9, the tripod legs being broken away.

Fig. 11 is a sectional elevation on line indicated by $x^{11}$—$x^{11}$, Fig. 9, the tripod legs being broken away.

Fig. 12 is a sectional elevation on line indicated by $x^{12}$—$x^{12}$, Fig. 9, the tripod legs being broken away.

Fig. 13 is a sectional elevation on line indicated by $x^{13}$—$x^{13}$, Fig. 9, the crank being omitted and the tripod legs being broken away.

Fig. 14 is a side elevation of the crank in Figs. 9 and 10 detached, a portion thereof being shown in mid section.

There is provided a tripod comprising legs 1 and a head 2 mounted on said legs. The connection between the legs and head is not shown in detail but it is understood that the legs may be hinged to the head in the usual or any preferred manner. The head 2 is provided with a recess 3, the outer wall of which is aslant upwardly and outwardly as indicated at 4. Seated in the recess 3 is a disk 5 having a flange 6. The periphery of the flange 6 is aslant upwardly and outwardly as indicated at 7 so as to correspond with the slanting face 4. The head 2 and disk 5 thus constitute a friction clutch.

The disk 5 is mounted on the hub 8 of a horizontal gear 9 which is journaled on a stud 10 having its lower end inserted in an opening 11 in the head 2. The hub 8 also projects through the opening 11. The lower end of the stud 10 is screw-threaded to receive a wing nut 12 adapted to be turned up against a spring washer 93 which is interposed between the wing nut and the lower projecting end of the hub 8. The lower end of the hub 8 is screw-threaded to receive a nut 94 adapted to be tightened up against a boss 13 through which the opening 11 extends. The upper end of the stud 10 is reduced in diameter and fits in an opening 14 in a boss 15 which forms a part of an upper base section 16. A pin 16' projects from the stud 10 into the boss 15 to hold the stud against turning relative to the section 16. The upper base section 16 is provided at opposite sides with standards 17.

The head 2 forms the lower base section, and between the lower base section and the upper section 16 is an intermediate base section 18, the three sections forming a chamber 19 to house the disk 5 and gear 9. The disk 5 is fastened by any suitable means to the gear 9, the fastening means in this instance being in the form of screws 20. The gear 9 is adapted to be driven by a gear 21 which in turn is driven in a manner hereinafter to be described.

Mounted at its ends in the standards 17 is a stationary shaft 22, there being screws 23 screwed into the ends of the shafts 22 against the standards 17 so as to hold the shaft 22 stationary. One end portion of the shaft 22 is provided with a bearing bushing 24 and journaled on said bushing is one of a pair of hubs 25, 26, the hub 26 being fastened by screws 27 or the like to a gear 28 which is rotatively mounted on the other end of the shaft 22. The hubs 25, 26 form downwardly extending portions of a camera supporting table indicated in general by the character 29. Between the hub 25 and a flanged collar 30 is interposed a friction disk 31 of leather or other suitable friction producing material. The collar 30 is held toward the friction disk 31 by a coil spring 32 surrounding the shaft 22, said spring being interposed between the collar 30 and a shoulder 33 on the shaft 22. Fastened to the shoulder 33 by screws 34 is a spring housing 35 enclosing the spring, a portion of the collar 30 being inserted in one end of the housing 35. The gear 28 is engaged by a gear 36.

The gear 9 is chambered at 37 and in said chamber is a springing washer 38 upon which is mounted a friction disk 39 formed of leather or other suitable frictional material. The spring washer 38 holds the friction disk 39 in engagement with the under surface of the base section 16, and is itself held against rotation relative to the gear 9 by pins 95 projecting from the gear.

The camera with which the support is to be used is mounted on the table 29 by any suitable means such, for instance, as those indicated in general by the character 40. Said means may be of the usual or any preferred construction and are not described in detail herein since they form no part of this present invention.

The foregoing described construction is common to both forms of the invention shown in the drawings, and features of the form shown in Figs. 1 to 8 only will now be described. The gear 21 is mounted on a hollow shaft 41 which surrounds an inner shaft 42. The outer end of the shaft 41 projects into a chamber 43 and said outer end is inserted in a tubular member 44 of a crank indicated in general at 45. The shaft 41 is provided with a longitudinally extending groove 46 adapted to be engaged by a spline 47 formed by the inner end of a lever 48 which is pivoted by a pin 49 to a crank arm 50, the inner end of said crank arm being formed by the tubular member 44. The lever 48 is accommodated more or less in a slot 51 in the crank arm 50. The spline 47 is provided with a detent 52 adapted to be selectively engaged with any one of a plurality of notches 53 in the shaft 41, said notches being formed in the bottom of the groove 46. The spline 47 serves to transmit motion between the crank arm 50 and the shaft 41; and the detent 52, not only prevents the crank arm from becoming disengaged with the shaft 41, but also holds the crank arm in any one of three predetermined positions relative to the shaft 41. These three different positions may be indicated by any suitable means and in the drawings the indicating means comprise annular shoulders 54 on the tubular member 44. When the outermost shoulder 54 registers with the outer end 55 of the chamber 43, the detent 52 is adapted to engage the innermost notch 53; and when the intermediate shoulder registers with the end wall 55 the intermediate detent 52 is adapted to engage the intermediate notch; and when the innermost shoulder 54 registers with the end face 55 the detent is adapted to engage the outermost notch.

One end of the shaft 42 is provided with an annular groove 56 adapted to be engaged by the hook-shaped end or detent 57 of a lever 58 which is accommodated in a slot 59 in the lever 48. The pivot of the lever 58 is formed by the pin 49 already described. The lever 58 is adapted to be releasably held in engagement with the groove 56 by a spring 60 which is fastened to the lever 48. The tubular member 44 is provided with a transversely extending pin 96 engaging a slot 97 in the adjacent end of the shaft section 73 so that turning of the crank 50 will rotate the shaft 42.

The lever 48 is adapted to be releasably held in engagement with the groove 46 and any one of the notches 53 by a spring 61 fastened to the crank arm 50. The main purpose of the lever 58 is to cause endwise movement of the shaft 42 when the crank arm 50 is moved in or out. The crank arm 50 is provided with a suitable handle 62 rotatively mounted on the crank arm by a screw 63.

The gear 36 is mounted on a hollow shaft 64 which surrounds a portion of the shaft 42 and abuts the shaft 41. The shaft 64 is provided on its outer end with a bevel gear 65 meshing with a bevel idler gear 66 which is mounted on a stud 67 journaled in a bearing 68 of a gear housing 69. Also meshing with the gear 66 is a bevel gear 70 which is mounted on a hollow shaft 71 rotating in a bearing 72 of the housing 69. The shaft 42 is formed in relatively movable sections, the groove 56 being formed in the section 73, and the section 74 extending into the hollow shaft 71. Fastened to the inner end of the shaft section 74 by a pin 75, or its equivalent, is a male clutch member 76 having pins 77, 78 adapted to engage recesses 79, 80 respectively in the gears 65, 70 respectively, the recessed portions of the gears forming the female clutch members. The pin 75 passes through a slot 81 in the shaft section 73 so that relative endwise movement of the sections 73, 74 is permitted and yet rotation of the section 73 will cause rotation of the section 74. When the clutch member 76 is in the neutral position shown in Fig. 3 and the crank is turned the shaft 42 will be turned, but neither of the gears 65, 70. If the shaft 42 be pulled to the right said shaft will be connected with the gear 65, and if said shaft be shifted to the left it will be connected with the gear 70. Thus the gear 28 may be turned in either direction according to the endwise position of the shaft 42, or the shaft 42 may be turned without producing rotation of the gear 28.

Now referring more particularly to the form of the invention shown in Figs. 9 to 14 inclusive, the gear 21 is fastened by a pin 82 to a shaft 83 which rotates in bearings 84. The shaft 83 is provided near each end with notches 85 adapted to be selectively engaged by a detent 53 on the inner end of a lever 48 pivoted at 49 in a crank arm 50 of a crank indicated in general by the character 98. The crank arm 50 is provided with a slot 51 to accommodate the lever 48. A spring 61 tends to hold the lever with the detent 53 in one of the notches 85. The crank arm 50 is provided with a handle 62 rotatively mounted on a screw 63. The crank construction just described is similar to that described above for the crank 59 and the same reference characters are used for corresponding parts. The tubular member 44 telescopes upon either end of the shaft 83, according to which one of his arms the operator desires to use in turning the crank.

The gear 36 is fastened by a pin 86, or the like, to a shaft 87 and the shaft 87 is provided with a bevel gear 88 meshing with a bevel gear 89 on a shaft 90 journaled in bearings 91. The shaft 90 is provided near its ends in its periphery with notches 92 which are similar to the notches 85 and which are adapted to be selectively engaged by a detent 53 of a crank indicated in general by the character 54, said handle being constructed exactly the same as the crank 98 previously described, and the parts of the crank 54 being designated by the same reference characters as those employed for describing the parts of the crank 98.

The invention operates as follows: First considering the form of the invention shown in Figs. 1 to 8 inclusive, and assuming that a camera, for example, a motion picture camera, is affixed to the table 29, the camera may be tilted forwardly and downwardly or forwardly and upwardly and may also be turned horizontally to the right or left by appropriate operation of the crank 45. Assuming, for example, that the parts are in the positions indicated in Fig. 3 with the clutch member 76 in neutral position, if the operator desires to turn the camera toward his right without tilting the camera he will turn the crank to his right. If he desires to turn the camera toward his left he will turn the crank to his left.

It will be clear that, in either of these turning or "panning" movements, the turning of the crank is transmitted by the spline 47 to the shaft 41, thence to the gear 21. Owing to the gear 9 being stationary in the base, this rotation of the gear 21 causes said gear to be given a planetary motion about the gear 9, thus causing rotation of the base sections 16, 18 and stud 10 relative to the gear 9. Since the table 29 is mounted on the base section 16, this turning of the base, also causes turning of the table and consequently of the camera.

If the operator desires to tilt the camera forwardly and downwardly without turning the same horizontally, he will push with his thumb or finger against the lever 48 to disengage the detent 52 from the intermediate notch 53, and he will push inwardly on the crank 45 as far as it will go so as to move the shaft 42 endwise toward the left in Fig. 3 and thus connect the gear 70 with said shaft. The operator will then turn the crank to the right, thus transmitting motion from the gear 70 to the gear 69 and from the gear 69 to the gear 65, thence to the shaft 64, thence to the gear 36 and from the gear 36 to the gear 28. The gear 28 turns counter-clockwise in Fig. 3 thus turning the hubs 25, 26 in the same direction so as to tilt the table 29 downwardly to the left in Fig. 3, which is downwardly and forwardly, since the operator stands with the crank 45 directly in front of him. This of course tilts the camera forwardly and downwardly.

If the operator desires to tilt the camera forwardly and upwardly, he will operate the crank in the reverse direction, or to the left while holding the spline 47 out of the groove 46. Also the operator may produce the forward and downward tilting by disengaging the detent 52 from the innermost notch 53 and pulling the crank 45 outwardly as far as possible so as to move the shaft 42 endwise toward the right to disconnect the gear 70 from the shaft 42 and to connect said shaft with the gear 65. To tilt the camera forwardly and downwardly the operator will now turn the crank to the left, and to tilt the camera forwardly and upwardly he will turn the crank to the right. The motions of the crank to effect the tilting movements, when the crank is pushed in, are reverse in direction to the movement of the crank for effecting the tilting when the crank is pulled out. This, of course, is due to the reversal of direction of turning of the shaft 64 effected by the different gears 70, 65, as is readily understood.

From what has already been stated as to the operations of turning and tilting the camera, it is clear that to simultaneously produce panning to the right and tilting forwardly and downwardly, the operator will place the detent 52 in the innermost notch 53 and will turn the crank to the right. To produce panning to the left and tilting of the camera forwardly and upwardly, he will turn the crank to the left. If it be desired to produce panning to the right and tilting forwardly and upwardly, the operator will cause the detent 52 to engage the outermost notch 53 and he will then turn the crank to the right. Also if it be desired to produce panning to the left and tilting of the camera forwardly and downwardly the operator will turn the crank to the left with the parts in the positions just described. From the foregoing it is clear that eight different results can be secured by movements of the single operating member, namely, the crank.

When the operator desires to turn the camera quickly without employing the crank, as is desirable in positioning the support preparatory to making the exposures or in returning the camera to its original position after "panning," the operator will loosen the nut 94 so that the flange 6 will no longer bind in the base section 2. The operator will then grasp the camera or the base section 16 with his hands and turn the same to the desired position. This turning movement of course moves the gear 21 about the axis of the stud 10, rotating the gear 9 with it. After the camera has been pointed in the desired direction, the operator will tighten the nut 94 so as to again secure the disk 5 to the base section 2, to thus hold the gear 9 stationary ready for "panning" by operation of the crank.

It is to be noted that owing to the provision of the friction disk 31 there will be no tendency of the camera to tilt to a different angle than that to which it is adjusted by turning of the crank, and the disk produces a braking action so that no matter how fast the crank may be turned, if it be released, the crank will stop almost immediately at the point where it is released.

It is to be further noted that the friction disk 39 functions to produce a braking effect on the base section 16 when turning said section to the right or left by operation of the crank, and that if the crank be operated and then suddenly released it will stop at substantially the point at which it is released.

The operation of the form of the invention shown in Figs. 9 to 13 will be clear from the description of the operation of the form of the invention shown in Figs. 1 to 8, the only difference being that the crank 98 is operated to the right or left to produce panning to the right or left, and the crank 54 is turned to the right or left to tilt the camera forwardly and downwardly or forwardly and upwardly. The form of the invention shown in Figs. 9 to 13 is the simpler of the two forms described. It is to be further noted in respect to the form of the invention shown in Figs. 9 to 13 that the cranks 54, 98 can be used on the left side of the base as shown in Fig. 9, or can be detached and connected on the right side of the base, depending upon the requirements or desires of the operator.

To remove the crank, the operator will depress the outer end of the lever 58 to disengage it from the shaft.

The invention is not limited in its broader aspects to the details of construction shown in the drawings and described above, but the invention includes such changes and modifications as may lie within the spirit and scope of the appended claims.

I claim:

1. In a support for a camera, a table for supporting a camera, a single operating member adjustable to different positions, and means operative by the operating member when said member is in one position of adjustment to effect tilting of the table forwardly and downwardly and operative when said member is in another position of adjustment to effect tilting of the table forwardly and upwardly.

2. In a support for a camera, a table for supporting a camera, a single operating member adjustable to different positions, and means operative by the operating member when said member is in one position of adjustment to simultaneously effect turning of the table in one direction and tilting of the table forwardly and downwardly and operative when said member is in another position of adjustment to simultaneously effect turning of the table in the opposite direction and tilting of the table forwardly and upwardly.

3. In a support for a camera, a table for supporting a camera, a single operating member adjustable to different positions, and means operative by the operating member when said member is in one position of adjustment to only effect turning of the table and operative when said member is in another position of adjustment to only effect tilting of the table.

4. In a support for a camera, a table for supporting a camera, a single operating member adjustable to different positions, and means operative by the operating member when said member is in one position of adjustment to only effect turning of the table and operative when said member is in another position of adjustment to simultaneously effect turning and tilting of the table.

5. In a support for a camera, a table for supporting a camera, a single operating member adjustable to different positions, and means operative by the operating member when said member is in one position of adjustment to only effect turning of the table and operative when said member is in another position of adjustment to simultaneously effect turning of the table in one direction and tilting of the table forwardly and downwardly and operative when said member is in a third position to simultaneously effect turning of the table in the same direction as before and tilting of the table forwardly and upwardly.

6. In a support for a camera, a base, a table having a depending hub rotatably mounted on the base, a gear connected with the hub, a second gear engaging the first gear, a disk, means to hold the disk against rotation, and a spring pressing the disk against the hub, the tension of the spring being insufficient to hold the hub from turning when the second gear is operated.

7. In a support for a camera, a base, a shaft supported by the base, a table mounted on the shaft, a gear to turn the table, and a crank operatively connected with said gear, the center of the table when horizontal being eccentric to a plane passing longitudinally through the shaft at right angles to the horizontal table.

8. In a support for a camera, a base, a shaft supported by the base, a table having depending hubs mounted on the shaft, a gear connected to one of the hubs, means to produce braking action on the other hub, and means to turn the gear.

9. In a support for a camera, a stationary member, a table, mechanism between the table and stationary member to turn the table including means to hold a portion of the mechanism against rotation, the mechanism-holding means being releasable to allow the table to be turned without direct operation of the table-turning mechanism.

10. In a support for a camera, a stationary member, a rotatively mounted gear, clutch means between the gear and stationary member, a rotatively mounted member, a shaft rotatively mounted in the last named member, means to turn the shaft, and a gear on the shaft meshing with the first named gear.

11. In a support for a camera, a stationary member, a table, means to tilt the table, mechanism between the table and stationary member to turn the table including means to hold a portion of the mechanism against rotation, the mechanism-holding means being releasable to allow the table to be turned without direct operation of the table-turning mechanism.

12. In a support for a camera, a stationary member, a rotatively mounted gear, clutch means between the gear and stationary member, a rotatively mounted member, a table on said last named member, means to tilt the table, a shaft rotatively mounted in the last named member, means to turn the shaft, and a gear on the shaft meshing with the first named gear.

13. In a support for a camera, a stationary member, a disk to frictionally engage the stationary member, a rotatively mounted member, a shaft rotatively mounted in the last named member, driving connections between the shaft and the disk, means to hold the disk tightly against the stationary member, and means to turn the shaft.

14. In a support for a camera, a stationary member, a member rotatively mounted on the stationary member, means on the last named member to support a camera, means to turn the second named member, a friction disk, and means to force the friction disk against the second named member.

15. In a support for a camera, a tiltably and rotatively mounted table adapted to support a camera, a crank arm, a rotatively mounted shaft connected with the crank arm, means operative by turning of the shaft when the shaft is moved endwise to one position to tilt the table forwardly and downwardly and operative by turning of the shaft in the same direction when the shaft is moved endwise to a different position to tilt the table forwardly and upwardly, a second shaft, means operative by turning of the second shaft to turn the table horizontally, and means for releasably connecting the crank arm with the second shaft.

16. In a support for a camera, a tiltably and rotatively mounted table adapted to support a camera, a crank arm, a rotatively mounted shaft connected with the crank arm, means operative by turning of the shaft when the shaft is moved endwise to one position to tilt the table forwardly and downwardly and operative by turning of the shaft in the same direction when the shaft is moved endwise to a different position to tilt the table forwardly and upwardly, said means being inoperative to tilt the table when the shaft is moved endwise to a third position, a second shaft, means operative by turning of the second shaft to turn the table horizontally, and means for releasably connecting the crank arm with the second shaft.

Signed at Los Angeles, California, this 13th day of August, 1919.

KARL W. THALHAMMER.

Witnesses:
 GEORGE H. HILES,
 L. BELLE WEAVER.